Figure 1:
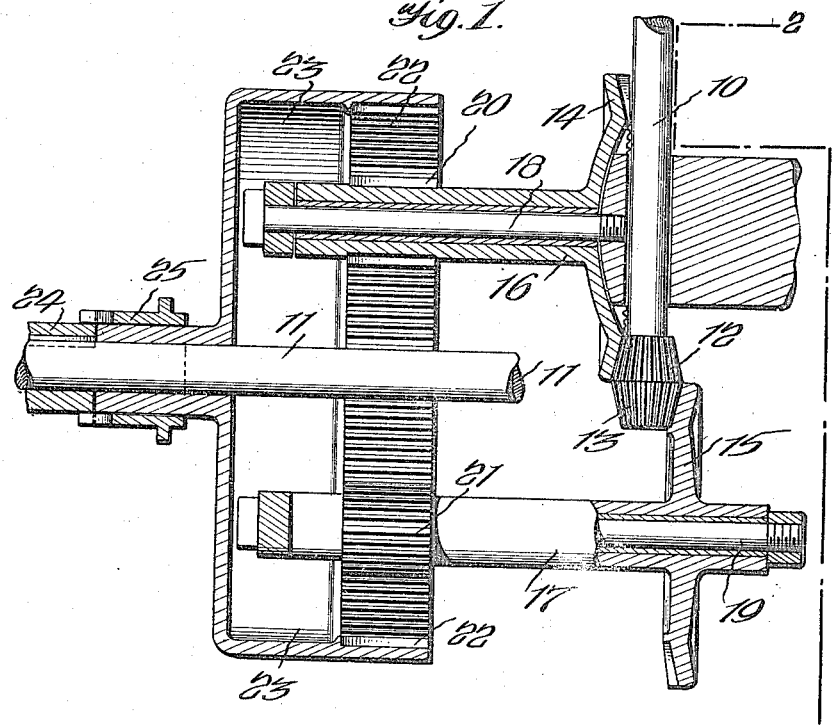

L. BRADEN.
TRANSMISSION GEARING FOR MOWING MACHINES.
APPLICATION FILED JUNE 28, 1916.

1,226,456.

Patented May 15, 1917.

WITNESSES

INVENTOR
LINCOLN BRADEN,
BY
ATTORNEYS

UNITED STATES PATENT OFFICE.

LINCOLN BRADEN, OF CARBON, CALIFORNIA.

TRANSMISSION-GEARING FOR MOWING-MACHINES.

1,226,456.                Specification of Letters Patent.        Patented May 15, 1917.

Application filed June 28, 1916.   Serial No. 106,351.

*To all whom it may concern:*

Be it known that I, LINCOLN BRADEN, a citizen of the United States, and a resident of Carbon, in the county of Shasta and State of California, have invented a certain new and useful Improvement in Transmission-Gearing for Mowing-Machines, of which the following is a specification.

My present invention relates particularly to mowing machine gearing, and aims to provide a novel transmission of a simple effective nature, for the purposes, and to the advantages, to be presently described in detail.

Among the objects of my present invention, I aim to provide a transmission gearing for mowing machines, in which there are two driving connections with the pitman shaft, these driving connections engaging opposite sides of the shaft so that their thrust is in opposite directions, the thrust of one counterbalancing the thrust of the other, so as to eliminate, so far as is possible in this way, the friction in the bearings of the driven end of the pitman shaft.

My invention further aims to provide a transmission gearing for mowing machines, the construction of which permits the pitman shaft to be placed in a position more nearly approximating the horizontal than is possible with the transmission gearings now in use, and to thus do away with the greater part of what is known as "wringing" motion of the pitman common to all machines in which the rear end of the pitman shaft is of necessity much higher than the crank or forward end.

A further object is to accomplish this latter advantage without sacrificing either the standardized clearance below the main shaft or axle of the machine, or the standardized length of the pitman shaft itself.

Still further my invention aims to provide a transmission gearing for mowing machines whose special construction will avoid the lifting of the left hand side of the main frame of the machine and the throwing of additional weight upon the shaft of the master gear, such as takes place in all machines where a single pinion is used in connection with the master gear, and is located to the rear of the main shaft or axle of the machine, and likewise to avoid the tendency of the master gear to climb up on the main frame of the machine, adding to the weight of the main frame, such as takes place where a single pinion is utilized and is located in front of the main shaft or axle of the machine.

With these objects in mind, the particular construction I utilize may be better understood and more thoroughly appreciated from the following description thereof, reference being made to the accompanying drawings forming part of this specification, and wherein—

Figure 2:
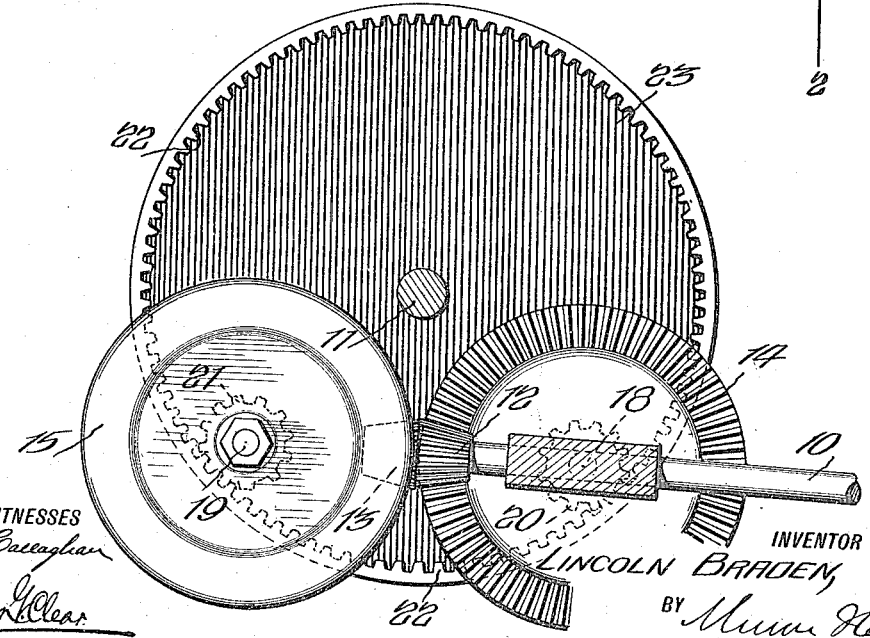

Figure 1 is a horizontal sectional view through the several parts constituting my invention, and Fig. 2 is a sectional elevation of these parts, taken substantially in a vertical direction along the line 2—2 of Fig. 1.

Referring now to these figures, in which the pitman shaft is clearly seen at 10, and the main shaft or axle at 11 in both of the figures, it will be noted that the upper rear end of the pitman shaft 10 is provided with a pair of bevel gears 12 and 13 inclined in relatively opposite directions, and engaged by bevel gears 14 and 15 respectively, at diametrically opposite sides of the axis of the pitman shaft.

The bevel gears 14 and 15, disposed as they are upon relatively opposite sides of the vertical plane of the pitman shaft 10, are respectively rigid with the outer ends of sleeves 16 and 17, the latter being journaled upon shafts 18 and 19 having bearings in suitable portions of the main frame, and parallel with, and upon relatively opposite sides of the vertical plane of, the main shaft or axle 11.

Upon their inner ends the sleeves 16 and 17 are respectively provided with pinions 20 and 21 in mesh with the internal gear ring 22 of the master gear 23, the latter of which is loosely disposed upon the main shaft or axle 11 and connected with a sleeve 24 rigid with the said shaft or axle, through a sliding clutch member 25.

Thus by the particular disposition of the shafts 18 and 19, it will be seen by reference to Fig. 2 that the inner pinions 20 and 21 of the sleeves 16 and 17 engage the gear ring of the master gear upon relatively opposite sides of the vertical plane of the main axle or shaft 11, so as to more effectively counterbalance the action of these parts and by thus dividing the transmission, enable smaller shafting to be utilized and a consequent reduction in friction of the bearings accomplished.

It will furthermore be seen that, by virtue of the particular disposition of the intermediate gears 14 and 15, and the particular manner in which they engage with the gears 12 and 13 of the pitman shaft, that the thrust against the pitman shaft is counterbalanced with consequent reduction in the friction of the bearings thereof adjacent its upper end.

I claim:

1. In mowing machine gearing, the combination with the main shaft or axle, and the pitman shaft, of a pair of oppositely inclined bevel gears carried by the pitman shaft, and gearing between said pitman shaft gears and the main shaft or axle, including intermediate transmission gears engaging the said oppositely inclined pitman shaft gears at diametrically opposed points.

2. In mowing machine gearing, the combination with the main shaft or axle, and the pitman shaft, of a master gear mounted on the main shaft, and gearing connecting the master gear with the pitman shaft and including intermediate gears engaging the master gear at points upon relatively opposite sides of the vertical plane of the main shaft, and shafts parallel with the said main shaft and upon which the said intermediate gears are mounted.

3. In mowing machine gearing, the combination with the main shaft or axle, and the pitman shaft, of a pair of gears carried by the pitman shaft, a master gear carried by the main shaft or axle, a pair of intermediate shafts parallel with the main shaft or axle, and inner and outer gears supported by each of said intermediate shafts, the inner gears being in mesh with the master gear, and the outer gears being in mesh with the pitman shaft gears.

4. In mowing machine gearing, the combination with the main shaft or axle, and the pitman shaft, of a pair of gears carried by the pitman shaft, a master gear carried by the main shaft or axle, a pair of intermediate shafts parallel with the main shaft or axle, and inner and outer gears supported by each of said intermediate shafts, the inner gears being in mesh with the master gear, and the outer gears being in mesh with the pitman shaft gears, the said inner gears of the intermediate shaft engaging the master gear at points upon relatively opposite sides of the vertical plane of the main shaft.

5. In mowing machine gearing, the combination with the main shaft or axle, and the pitman shaft, of a pair of gears carried by the pitman shaft, a master gear carried by the main shaft or axle, a pair of intermediate shafts parallel with the main shaft or axle, and inner and outer gears supported by each of said intermediate shafts, the inner gears being in mesh with the master gear and the outer gears being in mesh with the pitman shaft gears, the said outer gears engaging the gears of the pitman shaft at diametrically opposed points.

LINCOLN BRADEN.

Copies of this patent may be obtained for five cents each, by addressing the "Commissioner of Patents, Washington, D. C."